Patented July 17, 1934

1,966,711

UNITED STATES PATENT OFFICE 1,966,711

PREVENTION OF CORROSION

Melvin De Groote and Wilbur C. Adams, St. Louis, and Kenneth R. Farr, Webster Groves, Mo., assignors to Tretolite Company, Webster Groves, Mo., a corporation of Missouri No Drawing. Application September 25, 1933, Serial No. 690,942

8 Claims. (Cl. 252—5)

This invention relates to the art of preventing corrosion in metal structures of the kind that contain water, such, for example, as cooling systems of internal combustion engines.

The main object of the invention is to provide an aqueous anti-corrosive liquid, capable of use as a cooling medium or for other purposes, which is of such a character or nature that replenishing the same by the addition of ordinary raw water or hard water will not result in precipitation, deterioration, or destruction of the chemical reagent relied upon to prevent corrosion.

Another object is to provide an efficient and inexpensive anti-corrosive aqueous liquid for engine cooling systems, which is not injuriously affected by the addition or presence of antifreeze preparations or substances of the kind now used extensively in internal combustion engines to prevent the cooling medium from freezing in cold weather.

The aqueous anti-corrosive liquid which constitutes our invention can be easily produced by combining an oleic acid sulfate body in any suitable way with a quantity of water. In the case of a cooling medium for internal combustion engines it is only necessary to add the oleic acid sulfate body to the water of the cooling system, it being immaterial whether the water contains an anti-freeze compound or substance, such as denatured alcohol, diacetone alcohol, methyl alcohol, ethyl alcohol, glycerine, glucose, ethylene glycol, etc. As herein employed, the term "oleic acid sulfate" is used in a chemical sense to mean a chemical compound (not a mechanical mixture) which is an acid ester of sulfuric acid, and derived from oleic acid or an oleic acid-containing body. Said oleic acid sulfate is not a sulfonic acid or a fatty acid sulfonate, and it must be substantially free from unsulfated fatty material, either physically mixed or chemically combined. We have not found the dibasic sulfoleic acid, i. e., oleic acid hydrogen hydrogen sulfate, to be desirable, because it is not stable and decomposes. We prefer to use oleic acid sulfates in the form of stable salts in which either one or both of the acid hydrogens present are neutralized. These acid hydrogens may be neutralized by the same base or else they may be neutralized by different bases. For the purpose of neutralization the carbonates, bicarbonates, oxides or hydroxides of sodium, potassium, ammonium, calcium or magnesium may be employed. The hydrogen of the sulfate radical may be neutralized by washing with a neutral salt, such as sodium sulfate, potassium sulfate, ammonium sulfate, magnesium sulfate or calcium chloride. For the sake of convenience, the ammonium salt or a basic amine salt, such as the triethanolamine salt, being so similar in character to sodium and potassium salts, are considered as an alkali metal salt.

The salts in which the hydogen of the sulfate group is neutralized and the hydrogen of the carboxyl unneutralized will be referred to as the mono-salts. The salts in which both acid hydrogens are neutralized will be referred to as di-salts.

The manufacture of fatty acid sulfates, such as oleic acid sulfate, mixed with large quantities of other fatty materials, is well known in the art of preparing textile oils, as indicated by British Patent No. 17,655, of 1909. We have found that textile oils and Turkey red oils derived from an oleic acid body, even though they contain 30 to 45% of oleic acid sulfates mixed with other unsulfated fatty bodies, are entirely inferior for the purpose of preventing corrosion, because they precipitate with the calcium and magnesium salts invariably present in the raw water used in the cooling systems of internal combustion engines. Peculiarly enough, even though oleic acid hydrogen sulfate salts will not precipitate in the presence of calcium or magnesium in the absence of unsulfated fatty material, yet they do precipitate in the presence of unsulfated fatty material. Therefore, one could not obtain the desirable results described in the present application, by the use of a Turkey red oil, or by the use of sulfonated fatty acid containing 30 to 45% of oleic acid sulfates mixed with other unsulfated fatty bodies. Oleic acid hydrogen hydrogen sulfate salts are the salts of oleic acid hydrogen hydrogen sulfate, which is sometimes known as hydrogen sulfate stearic acid, and its composition is shown by the following formula:

$C_{17}H_{33}.H.HSO_4.COOH.$

In practising our invention we use oleic acid sulfates in the form of mono or di-salts, and in the substantial absence of other unsulfated fatty material. However, water present in the reagent as a result of the manufacturing procedure, is not objectionable, because the reagents are used in aqueous solution in radiators or similar devices, and must not decompose in the presence of water. Small amounts of solvents such as carbon tetrachloride or chloroform may be present, but it is absolutely necessary that extraneous fatty material, either chemically or physically mixed, be almost nil. In actual use, there is no objection to the presence of anti-freeze compounds of substances of the kind previously mentioned. In producing our improved aqueous anti-corrosive liquid the reagent is added to water in predetermined proportions.

The first step in the preparation of the reagent used as a corrosion preventor in our invention, is to treat oleic acid, commonly known as red oil, with a sulfonating agent, such as sulfuric acid in the presence of or absence of a solvent, such as carbon tetrachloride, and obtain a mixture relatively high in oleic acid ester of sulfuric acid (oleic acid hydrogen hydrogen sulfate). This mixture is washed once with water so as to remove the excess of uncombined sulfuric acid. After separation it is dissolved in water and extracted repeatedly with a suitable organic solvent, such as ethyl ether. This removes unsulfated fatty bodies, hydroxystearic acid and the like. If unsulfated bodies chemically combined are present, saponification must precede extraction. After sufficient extractions the clear solution should contain oleic acid hydrogen hydrogen sulfate in the substantial absence of other fatty material. This sulfated fatty material may be washed or neutralized, as indicated in British Patent No. 17,655 (1909) with any suitable salt or base, but most preferably with ammonium, sodium or potassium hydroxides. It is preferably neutralized so that it represents an approximately equal part of the mono-salt and the di-salt. In other words, all the hydrogen of the sulfate radical is neutralized and half of the hydrogen of the carboxyl radical. As previously explained, the hydrogen of the sulfate radical may be neutralized with one base, such as potassium, and the hydrogen of the carboxyl may be neutralized with another base, such as sodium. The corrosion preventative reagent may consist of a mixture of salts, and as previously stated, is employed by solution in the aqueous medium of the cooling system.

The corrosion preventative reagent that we prefer to use in cooling systems of internal combustion engines consists of oleic acid hydrogen sulfate in which all the hydrogen of the sulfate and half the hydrogen of the carboxyl has been neutralized with caustic soda. We have found that a mixture of approximately equal parts of the monosodium salt and the disodium salt is more effective than either one alone and we particularly prefer to use such a mixture derived from the sulfation of oleic acid. In practising our invention we prefer to add approximately one-half of 1% of the oleic acid sulfate to the water, or water and anti-freeze compound, in the cooling system. At times it has been found possible to use as little as one-tenth of 1% of our reagent, and yet obtain excellent results. At other times it may be necessary to use as much at 2% of our reagent, or even a trifle more to give a non-corrosive cooling medium. The addition of these reagents to the aqueous mixture is such an obvious procedure that no description is required. If the capacity of the cooling system is known, the amount of reagent to be added can be readily calculated. The minimum amount should be used, which will produce the desired results. If desired, the reagent may be added directly to any suitably anti-freeze solution, and thus one may obtain an anti-freeze compound or substance which not only lowers the freezing point of the cooling medium, but also prevents corrosion. Frequently, it is most desirable to make a concentrated solution of our reagent, for example, a 10 to 20% solution, and add such solution instead of the more viscous reagent itself.

The aqueous anti-corrosive liquid constituting our invention has a number of unusual advantages, due to the peculiarities of the reagent used to produce said non-corrosive liquid. Oleic acid sulfates appear to be unique, in that they have marked corrosion-preventing properties over other fatty acid sulfates, when added to water, or water mixed with an anti-freeze compound. For instance, fatty acid sulfates derived from other oils, such as castor oil, sperm oil, cocoanut oil, rapeseed oil, etc. do not have the same intensive rust-preventing and corrosion-preventing properties as oleic acid sulfates. It is to be noted that we do not claim the use of fatty acid sulfates broadly to produce an aqueous anti-corrosive liquid. We thus infer that other fatty acid sulfates are not the equivalent of oleic acid sulfates in this corrosion-preventing property. Oleic acid sulfate, when used as herein described, appears to be unique. Furthermore, oleic acid sulfates may be used in hard water without precipitation taking place in the cooling system. This is not true of other fatty sulfates. Ordinarily, if other sulfonated fatty products, having some resistance to precipitation by calcium or magnesium salts, be added to a cooling system, they may stay in solution temporarily, but as the water of the cooling system volatilizes and fresh, raw water containing calcium and magnesium salts is added, there eventually comes a point where precipitation of the reagent takes place and the benefits of the corrosion-preventing reagent are lost. Regardless of how much raw water or hard water is used to replenish the cooling medium containing the reagent herein contemplated, there is no precipitation or destruction of the reagent. Furthermore, whereas other fatty acid sulfates tend to produce foam and froth which may reduce the efficiency of the cooling medium by forming bubbles, or else may even cause the radiator of the cooling system to boil over, we have found that oleic acid sulfates are relatively free from this undesirable property.

We are aware of the fact that U. S. Patent No. 1,878,468, dated Sept. 20, 1932 to Covell discloses an aqueous anti-corrosive liquid for engine cooling systems in which the specific corrosion-preventing reagent is a sulfonated fatty acid partially neutralized but containing a substantial quantity of unneutralized sulfonated fatty acid. In order that the distinction may be clear as to the character of our reagent and the character of the reagent disclosed in said Covell patent, we will point out the following salient facts: sulfonated castor oil or Turkey red oil as disclosed by Covell, is a mixture of various complex substances (see Chemical and Metallurgical Engineering, volume 40, No. 5, page 242, 1933). The corrosion-preventing reagent which we employ is not a mixture, but instead, is a single chemical compound, to wit, an oleic acid sulfate. In said Covell patent the preferred reagent is derived from castor oil. We have found that fatty acid sulfates derived from castor oil are not suitable for use as a corrosion preventing agent in producing the aqueous anti-corrosive liquid constituting our invention. Likewise, said Covell patent recites sulfonated fatty products which may be employed as equivalents or substitutes for a reagent derived from castor oil. We have found no other fatty acid sulfate to be the equivalent or which may be substituted for oleic acid sulfates, and hence, we contend that oleic acid sulfates are unique in the production of an aqueous anti-corrosive liquid. Said Covell patent indicates that completely neutralized sulfonated fatty bodies are unsatisfactory, whereas, in our invention completely neutralized oleic acid sulfates may be employed as the corrosion-preventing reagent. Finally, said Covell patent specifies the presence of a substantial quantity of unneutralized soluble sulfonated fatty acid. Since this consists largely of unsulfated fatty acid, it would mean the presence of material which is absolutely objectionable when oleic acid sulfates are used. The corrosion-preventing reagent contemplated by our invention must be substantially free from any appreciable amount of unneutralized fatty acid or completely unneutralized sulfo fatty acid or neutralized non-sulfo fatty acids.

Having thus described our invention, what we claim as new and desire to secure by Letters Patent is:

1. An anti-corrosive liquid for the purpose mentioned, containing salts of oleic acid hydrogen hydrogen sulfate substantially free from any extraneous fatty bodies, such as unneutralized fatty acid.

2. An aqueous anti-corrosive liquid for the purpose mentioned, containing alkali metal salts of oleic acid hydrogen hydrogen sulfate, substantially free from any extraneous fatty bodies, such as unneutralized fatty acid.

3. An aqueous anti-corrosive liquid for the purpose mentioned, containing a mixture of mono-alkali metal salts and di-alkali metal salts derived from oleic acid hydrogen hydrogen sulfate, substantially free from any extraneous fatty bodies, such as unneutralized fatty acid.

4. An aqueous anti-corrosive liquid for the purpose mentioned, containing substantially equal amounts of mono-alkali metal salts and di-alkali metal salts derived from oleic acid hydrogen hydrogen sulfate, substantially free from any extraneous fatty bodies, such as unneutralized fatty acid.

5. An aqueous anti-corrosive liquid for the purpose mentioned, containing substantially equal amounts of the monosodium salt and the disodium salt derived from oleic acid hydrogen hydrogen sulfate, substantially free from any extraneous fatty bodies, such as unneutralized fatty acid.

6. The art of preventing corrosion in metal structures containing an aqueous medium, which comprises maintaining in said aqueous medium a substantial concentration of salts of oleic acid hydrogen hydrogen sulfates, substantially free from any extraneous fatty bodies, such as unneutralized fatty acid.

7. The art of preventing corrosion in metal structures containing an aqueous medium, which comprises maintaining in said aqueous medium a substantial concentration of equal amounts of the mono-alkali metal salt and the di-alkali metal salt derived from oleic acid hydrogen hydrogen sulfate, substantially free from any extraneous fatty bodies, such as unneutralized fatty acid.

8. The art of preventing corrosion in metal structures containing an aqueous medium, which comprises maintaining in said aqueous medium a substantial concentration of an equal amount of the monosodium salt and the disodium salt derived from oleic acid hydrogen hydrogen sulfate, substantially free from any extraneous fatty bodies, such as unneutralized fatty acid.

MELVIN DE GROOTE.
WILBUR C. ADAMS.
KENNETH R. FARR.